US012665273B2

(12) United States Patent
Goossens et al.

(10) Patent No.: US 12,665,273 B2
(45) Date of Patent: Jun. 23, 2026

(54) SYSTEM AND METHOD FOR ACCELERATING THE INFILTRATION OF LIQUID ELECTROLYTE IN A BATTERY CELL

(71) Applicant: Project Engineering and Contracting NV, Leuven (BE)

(72) Inventors: Raphael Jan J. Goossens, Rotselaar (BE); Louca Raphael Goossens, Aarschot (BE)

(73) Assignee: PROJECT ENGINEERING AND CONTRACTING NV, Leuven (BE)

( * ) Notice: Subject to any disclaimer, the term of this patent is extended or adjusted under 35 U.S.C. 154(b) by 516 days.

(21) Appl. No.: 18/448,424

(22) Filed: Aug. 11, 2023

(65) Prior Publication Data

US 2025/0055168 A1     Feb. 13, 2025

(51) Int. Cl.
*H01M 50/609*     (2021.01)
*H01M 10/04*     (2006.01)
*H04R 31/00*     (2006.01)

(52) U.S. Cl.
CPC ..... *H01M 50/609* (2021.01); *H01M 10/0404* (2013.01); *H04R 31/006* (2013.01)

(58) Field of Classification Search
CPC ......... H01M 10/0404; H01M 10/0525; H01M 50/609
See application file for complete search history.

(56) References Cited

U.S. PATENT DOCUMENTS

2022/0268851 A1     8/2022     Epureanu et al.

FOREIGN PATENT DOCUMENTS

| CN | 106053614 | A | 10/2016 | |
|----|-----------|---|---------|---|
| CN | 107579196 | A | 1/2018 | |
| CN | 115377505 | A | 11/2022 | |
| KR | 19990055239 | A | 7/1999 | |
| KR | 20170088034 | A | 8/2017 | |
| KR | 102548344 | B1 * | 6/2023 | ............ H01M 50/60 |
| WO | WO-2012069100 | A1 * | 5/2012 | .......... H01M 50/618 |

OTHER PUBLICATIONS

Extended European Search Report from corresponding EP Application No. 23191204.9, Feb. 12, 2024.

* cited by examiner

*Primary Examiner* — Kevin E Yoon
(74) *Attorney, Agent, or Firm* — Workman Nydegger

(57) ABSTRACT
The present invention relates to a system a system for accelerating the infiltration of a liquid electrolyte in a battery cell, the system comprising: means for positioning the battery cell; a transducer for generating a wave in response to an excitation signal, a controller for controlling the transducer; wherein the transducer and the battery cell are positioned such that the battery cell sits in the direction of propagation; wherein the transducer and the battery cell are positioned such that a distance from the transducer to a surface of the battery cell, furthest away from the transducer, is equal to or larger than one fourth of the wavelength; wherein the controller is configured to bring the voltage and the current of the excitation signal in phase with one another. The present invention also relates to a method or accelerating the infiltration of a liquid electrolyte in a battery cell.

14 Claims, 3 Drawing Sheets

SYSTEM AND METHOD FOR ACCELERATING THE INFILTRATION OF LIQUID ELECTROLYTE IN A BATTERY CELL

FIELD OF THE INVENTION

The present invention relates to the filling of battery cells with liquid electrolyte.

BACKGROUND

Many types of electrochemical devices employ porous electrodes and a liquid electrolyte. A classic lithium battery cell—featuring a composite metal-oxide cathode, a composite graphite anode, a separator and an electrolyte composed of an organic solvent and dissolved lithium salts—is the most well-known and ubiquitous example of such a device.

During manufacturing of a lithium battery cell, the electrodes and separator are first placed in the cell casing before the cell is filled with electrolyte and charged. This filling is a critical step in the manufacturing process for multiple reasons. First of all, the electrolyte needs to permeate all the voids in the porous electrodes to ensure that the cell achieves optimum energy density, power density and coulombic efficiency. Secondly, sufficient wetting of the porous electrodes is important to ensure a uniform solid-electrolyte interface (SEI) growth and to limit future degradation phenomena such as electrolyte decomposition and lithium dendrite formation. In third place, the wetting process needs to proceed as fast as possible because there are undesirable parasitic reactions which occur in the uncharged cell after filling with electrolyte; a long wetting time may lead to a loss of active material and electrolyte, while also creating nucleation sites for future lithium dendrite growth.

Current manufacturing practice uses a fixed volume piston to inject the electrolyte into cells with a hard casing, like cylindrical or prismatic cells, or pours a fixed volume of electrolyte into pouch cells. For smaller cell sizes, the dead volume of the cell can act as a buffer for the amount of electrolyte that does not instantly infiltrate the porous electrodes, leading to sufficiently fast filling of the cells. However, cell manufacturers are moving towards bigger cell formats due to the increased volumetric and gravimetric energy density of these larger cells. In larger cells, the dead volume is insufficiently large to accommodate the non-infiltrated electrolyte volume. Consequently, the electrolyte injection speed or pouring rate is determined by the rate at which the electrolyte infiltrates the porous electrodes. Without external influence, it takes a couple of hours for the electrolyte to sufficiently wet the porous electrodes, which is an unacceptably long period of time—both for the above-mentioned technical reasons as well as for economical reasons. Therefore, three techniques are employed to enable cell filling to proceed at an acceptable rate.

First of all, cell filling is implemented as a batch process wherein a large number of cells are filled in parallel. Secondly, the cells are placed in a low vacuum environment to aid with the evacuation of the gases trapped inside the porous electrodes. In a batch process, this implies that the cells of a single batch are placed together in a vacuum chamber. In third place, cells are filled in multiple steps: in each step, a fixed volume of electrolyte is injected. In between steps, the cells are typically kept in a low vacuum, elevated temperature environment—where even pressure cycles may be applied—to enhance electrolyte wetting. Depending on the cell size and construction, two to three filling steps may be required—each step taking up to 30 minutes in time—with a vacuum wetting period of up to multiple hours (hours) between each filling step.

This filling process has many disadvantages associated to it. Firstly, because cells are filled in parallel, the slowest cell of the batch determines the filling speed of the entire batch. Consequently, a cell into which the electrolyte infiltrates particularly slowly can greatly prolong the filling process of the entire batch. In second place, because multiple cells are placed together in a vacuum chamber, electrolyte spilling from one cell soils all of the cells of the batch and cleaning, as well as the (frequently required) maintenance of even a single injection system, results in a standstill of the entire cell production line. Typically, this standstill time is as high as 2 to 4 hours a day. Thirdly, it takes a lot of energy to create an atmosphere with a sufficiently low vacuum and a sufficiently low dew point (to prevent electrolyte decomposition) in a batch processing chamber. Even then, the vacuum might not be low enough, leading to slow electrolyte infiltration or nefarious side reactions. Further, the vacuum wetting step requires a lot of floor space in the typically expensive and high energy consuming dry room ambient part of the manufacturing facility. Finally, even though the filling process can take multiple hours to complete, resulting in parasitic reactions in the meantime, it still does not achieve full wetting of the electrodes.

Some cell manufacturers have discovered that exposing the battery cell to ultrasonic waves during the filling process might accelerate the electrolyte infiltration. Documents KR1019990055239A and KR1020170088034A disclose a system wherein a battery cell is submerged in a liquid bath during the filling process. An ultrasonic transducer transmits ultrasonic waves to the liquid bath. The submersion of the battery cell in the liquid serves two purposes. First of all, the liquid ensures that the ultrasonic waves are transmitted to the battery cell and do not reflect off the battery casing. Secondly, the liquid ensures that the ultrasonic power is distributed over a sufficiently large external surface of the battery cell such that the battery cell is not damaged due to the concentration of ultrasonic power on a small area of the cell.

While this solution is capable of accelerating electrolyte infiltration, the need for submersion of the battery cells in the liquid bath entails several drawbacks. First of all, the exterior surface of the battery cells needs to be dried after the removal of the cells from the bath. This requires an additional machine, additional energy input, additional floor space in the production facility and additional time. Secondly, care must be taken that the liquid does not infiltrate the battery cell through the filling opening to prevent unwanted side reactions. In third place, the liquid should be chosen carefully to prevent reactions with the battery casing. Finally, the liquid cannot include water since the inevitable evaporation of water would make it nearly impossible to realize a sufficiently low dew point in the filling facility. This necessitates the usage of a non-volatile solvent, which is more expensive and possibly highly reactive and/or toxic.

Therefore, there is still a need for an alternative and improved system and method for accelerating the infiltration of liquid electrolyte in a battery cell.

SUMMARY

The present invention aims to remedy the above-mentioned and other disadvantages. Even though the remainder of the disclosure explicitly discusses the invention in the context of battery cells, the skilled person will appreciate that the present invention is applicable to other types of electrochemical cells employing a liquid electrolyte.

According to a first aspect of the invention, a system for accelerating the infiltration of a liquid electrolyte in a battery cell is disclosed, the system comprising:

means for positioning the battery cell;

a transducer for generating a wave in response to an excitation signal, the excitation signal having a voltage, a current and a dominant frequency, the wave having a wavelength and a direction of propagation;

a controller for controlling the transducer;

wherein the transducer and the battery cell are positioned such that the battery cell sits in the direction of propagation; wherein the transducer and the battery cell are positioned such that a distance from the transducer to a surface of the battery cell, furthest away from the transducer, is equal to or larger than one fourth of the wavelength; wherein the controller is configured to bring the voltage and the current of the transducer in phase with one another.

Throughout this disclosure, the term "impedance" will be used. Depending on the context, this term can refer to one or more of the following specific uses:

electrical impedance—the ratio of the voltage phasor to the current phasor in an electrical circuit;

wave impedance—the ratio of the transvers components of the electric and magnetic fields of an electromagnetic wave;

acoustic impedance—the relationship between applied acoustic pressure and the resulting acoustic volume flow rate;

mechanical impedance—the relationship between the force applied to a structure or medium and the resulting movement of said structure or medium.

Wherever possible, one of the more specific terms will be used throughout this text. However, in some circumstances, the generic term "impedance" will be used, for instance where it is appropriate to describe a general concept that applies to both electromagnetic and mechanical waves. In this case, the skilled person will be capable of determining the meaning(s) of impedance that is/are implied from the context of the text.

The transducer may be any kind of transducer that is capable of generating a mechanical or an electromagnetic wave in response to an electrical excitation signal. A voltage may be imposed on the transducer by an external power source, in which case the electrical impedance of the transducer and the output electrical impedance of the power source will determine the current flowing through the transducer. Alternatively, the external power source may impose a current on the transducer, in which case the electrical impedance of the transducer will determine the voltage over the transducer. Throughout this disclosure, the term "excitation signal" will refer to the ensemble of the voltage over the transducer and the current through the transducer, without making a distinction between both cases.

The voltage and/or current of the excitation signal may not be perfect DC quantities or perfectly sinusoidal AC quantities. In addition, even when a perfect sinusoidal AC voltage or current is imposed, the possibly non-linear behavior of the transducer and/or the power source may cause the resulting current or voltage to be not sinusoidal. Generally, the frequency spectrum of the voltage and current will thus comprise more than a single frequency. Throughout this disclosure, the term "dominant frequency" will refer to the spectral component of the voltage and/or current that has the highest amplitude in the frequency domain. It is assumed that the dominant frequency is the same for both the voltage and current of the excitation signal. The dominant frequency may equal the fundamental frequency of the voltage and/or current, but the dominant frequency may also equal a harmonic frequency.

The wave generated by the transducer has an amplitude, a wavelength and a direction of propagation. For the transducers used within the context of the present disclosure, the wavelength can be modified by modifying the excitation signal of the transducer. Preferably, the wavelength depends-either in a linear or a non-linear fashion-on the dominant frequency of the excitation signal. Preferably, the amplitude of the wave can also be modified by modifying the excitation signal, for instance by changing the amplitude or duty cycle of the excitation signal. Preferably, the wavelength and the amplitude can be modified independently of one another. The wave also has a direction of propagation. The skilled person is aware that in practice, most wave-generating transducers do not display a perfectly unidirectional radiation pattern but rather a radiation pattern wherein the radiated power varies gradually as a function of the solid angle as seen from the transducer. In this case, the direction of propagation of the wave is defined as the direction in which the radiation pattern of the transducer displays its maximum amplitude.

The present invention is based on the insight of the inventors that a standing wave, caused by resonance in the resonator defined by the transducer and the battery cell, can effectively accelerate the infiltration of liquid electrolyte in the battery cell. Because of the nature of the standing wave, energy gets transferred to all of the electrolyte in the cell and is not concentrated in a single spot. Therefore, the standing wave can effectively transfer energy to the liquid electrolyte in the cell-thereby increasing its kinetic energy and/or decreasing its apparent surface tension and consequently increasing its rate of infiltration into the porous structure-without requiring a large contact area with the casing of the battery cell. There is thus no need to submerge the cell in a liquid medium to ensure energy transfer or to avoid localized damage.

There are two sufficient and necessary conditions to ensure that a standing wave develops in the resonator defined by the transducer and the battery cell. First of all, the distance between the transducer and the far end of the battery casing should be equal or superior to one fourth of the wavelength of the wave generated by the transducer. Secondly, the voltage over the transducer and the current through the transducer—or, more generally, the dominant frequency components of the voltage over the transducer and the current through the transducer—should be in phase with one another.

In practice, the sufficient and necessary conditions are realized in the following manner. A battery cell is kept in place by a means for positioning the battery cell. The means for positioning ensures that the cell sits in the direction of propagation of the transducer. In addition, the means for positioning ensures that the distance between the transducer and a surface of the battery cell, furthest away from the transducer, is equal to or larger than one fourth of a wavelength that can be generated by the transducer. In practice, many transducers can generate waves of various wavelengths. Preferably, the distance between the transducer and the battery cell surface is such that it is equal or superior to one fourth of most wavelengths that can be generated by the transducer. This effectively ensures that a significant part of the wavelength range of the transducer can be employed.

A controller is configured to bring the voltage over the transducer and the current through the transducer—or, more generally, the dominant frequency components of the voltage over the transducer and the current through the transducer—in phase with one another. The controller may bring the voltage and current continuously, periodically or sporadically in phase with one another. To this end, the controller is preferably capable of detecting whether voltage and current are in phase with one another. Such detection means may be implemented on the hardware level, for instance by means of a phase-frequency detector, or on the software level, for instance by means of the calculation of a fast Fourier transform of voltage and current or of an autocorrelation of voltage and current.

In some embodiments of the system, the controller is configured to modify the dominant frequency of the excitation signal in order to bring the voltage and the current of the excitation signal in phase with one another.

This bringing into phase may for instance be accomplished by performing a frequency sweep on the dominant frequency of the excitation signal. At a specific frequency of the excitation signal, the wavelength of the generated wave will be such that a standing wave will be created in the resonator defined by the transducer and the battery cell. The controller may periodically repeat the frequency sweep, or the controller may store the specific frequency at which resonance occurred in order to execute subsequent frequency sweeps in a more narrow range around the specific frequency or in order to keep the frequency constant at the given frequency. Alternatively, instead of or in combination with relying on a frequency sweep of the excitation signal, the controller may also be configured to actively control the phase difference between the voltage and current of the excitation signal. Additionally or alternatively, the controller may be configured to use one or more specific frequencies that are expected to result in a voltage and current of the excitation signal being phase with one another, derived from analytic equations and/or a finite element simulation.

In this context, it should be noted that firstly, more than one specific frequency will lead to the creation of a standing wave—the higher frequencies corresponding to higher harmonics—and secondly, the specific frequencies that lead to resonance might change with the degree of infiltration of electrolyte in the battery cell. In addition, the power transmitted from the transducer to the battery cell is not necessarily the same at every frequency that leads to resonance; at some frequencies, the standing wave might dissipate more energy in the battery cell than at others. The controller may check for this behavior, for instance by monitoring the amplitude of the current through the transducer at a fixed amplitude of the transducer voltage. The controller may for instance be configured to impose the frequency that leads to maximum power draw at resonance under certain conditions to maximize the speed of electrolyte infiltration. The controller may be configured to impose a frequency that leads to lower power draw at resonance under different conditions to minimize the risk of damage to the battery cell. In order to select the frequency that corresponds to the desired filling behavior, the controller may be adapted to take into account real-time information on the infiltration speed (or, as value representative of the latter, the pump speed), as a feedback signal.

In some embodiments of the system, the system further comprises a waveguide positioned between the transducer and the battery cell.

The usage of a waveguide entails multiple advantages. First of all, if no waveguide is present, the transducer is preferably positioned close to or in physical contact with the battery cell to limit excessive dissipation of the wave towards the surroundings. This implies that the distance between the transducer and the opposite end of the battery cell—and hence the length of the resonant cavity—is short. Since the maximum wavelength of the wave is determined by the length of the resonant cavity if a standing wave is to be created, a short length of the resonant cavity makes it mandatory to generate a high frequency wave. This might pose a problem, especially when employing mechanical waves such as acoustic waves, where the wavelengths are typically much larger than in electromagnetic waves. Since a waveguide can prevent dissipation of the wave, a waveguide positioned between the transducer and the battery cell can be employed to increase the distance between the transducer and the battery cell, thereby lengthening the resonant cavity and increasing the allowable wavelength range for the purpose of the invention. To this end, the first end of the waveguide is preferably in contact with the transducer and the second end of the waveguide is preferably in contact with the battery cell.

Secondly, the waveguide allows to focus the radiated power of the transducer on a more narrow surface area. This makes it possible to effectively direct nearly all the radiated power to the battery cell, irrespective of the radiation pattern of the transducer. This is sometimes referred to as an acoustic lens.

In third place, a waveguide makes it possible to modify the direction of propagation of waves, for instance for guiding waves around bends and/or corners. If, for one reason or another, it would be beneficial to construct the system in such a way that the battery cell does not directly line up with the transducer, a waveguide can be employed to ensure that the battery cell does sit in the direction of propagation of the wave generated by the transducer.

In a more specific embodiment, a waveguide is provided to combine the power of a plurality of transducers forming an array, notably a phased array.

The skilled person knows how to construct a suitable waveguide in view of the employed type of waves, the radiation pattern of the transducer and the envisaged wavelength range.

In some embodiments of the system, the system further comprises an impedance matching layer positioned between the transducer and the battery cell.

Generally, the output impedance of the transducer will differ from the input impedance of the battery cell. In addition, if the transducer and the battery cell are physically separated from one another by an intervening medium, such as for instance a layer of air or another gas, this medium can have yet another impedance. If the impedance mismatch at an interface is too large, a significant part of the generated wave will be reflected towards the source. This has at least three drawbacks. First of all, if a significant amount of reflection occurs at the surface of the battery cell closest to the transducer, a separate resonant cavity with a shorter length is created between the transducer and the battery cell. In this case, control of the system becomes more difficult since the system will now have more resonant modes, some of which are not useful for the purpose of the invention. Secondly, the reflection of power towards the transducer might damage the transducer. Finally, the efficiency of the system will be lowered since the power radiated by the transducer will be significantly higher than the power absorbed by the electrolyte in the battery cell.

The inclusion of an impedance matching layer between the transducer and the battery cell may reduce the amount of wave reflection that occurs at the surface of the battery cell closest to the transducer, thereby remedying the problems mentioned hereabove. Preferably, one side of the impedance matching layer is in contact with the transducer and the other side of the impedance matching layer is in contact with the battery cell. Preferably, the contact area of the impedance matching layer with the battery cell substantially covers the entire area of the surface of the battery cell that is closest to the transducer.

The impedance matching layer may comprise a single layer, the single layer having an impedance in between the output impedance of the transducer and the input impedance of the battery cell. Alternatively, the impedance matching layer may comprise multiple layers, each layer having a different impedance that is in between the output impedance of the transducer and the input impedance of the battery cell, the layers being arranged in order of increasing or decreasing impedance. In this case, the layer whose impedance matches the output impedance of the transducer the most closely is positioned next to the transducer whereas the layer whose impedance matches the input impedance of the battery cell the most closely is positioned next to the battery cell. Such a multilayer structure allows to further reduce wave reflection when compared to a single layer structure. In yet another alternative, the impedance matching layer may have an impedance that varies gradually in the thickness direction, from a value that is equal or close to the output impedance of the transducer to a value that is equal or close to the input impedance of the battery cell. Such a structure may allow for even further reflection reduction.

The impedance matching layer may be employed with or without the presence of a waveguide. For instance, an impedance matching layer may be arranged at one end or at both ends of the waveguide. In order not to nullify the effect of the impedance matching layer, it is important that the impedance of the waveguide is also matched to the impedance of the adjacent structures.

In some embodiments of the system, the impedance matching layer is designed to maximize a power transfer from the transducer to the battery cell. Such an embodiment can be realized by ensuring a large contact area between the impedance matching layer in the cell. For instance, in the case of a cylindrical cell, the impedance matching layer may not only contact the bottom surface of the cell, but also the side surface.

In some embodiments of the system, the impedance matching layer is designed to maximize a power efficiency of the system. Such an embodiment can be realized by ensuring that as little wave reflection as possible occurs, for instance by means of an impedance matching layer that has a gradually varying impedance, as described hereabove.

To ensure that substantially all power radiated by the transducer is transmitted to the battery cell, it might be necessary to include a waveguide in these embodiments.

In some embodiments of the system, the system further comprises a filling head for filling the battery cell with liquid electrolyte. To this end, the battery cell comprises a filling opening. The filling head then engages with, is inserted into or hovers above the filling opening.

The skilled person understands that preferably, the means for positioning position the battery cell in such a way that the filling opening points upwards.

In some embodiments of the system, the filling head is located on an opposite side of the battery cell when compared to the transducer. More generally, since the system may comprise a waveguide which might redirect the wave impinging on the battery cell, the filling head is located on an opposite side of the battery cell when compared to the surface on which the wave impinges.

Since the filling head may comprise sensitive electrical and/or mechanical components, it is preferable that the wave is not transmitted to the filling head, or that the wave is only transmitted to the filling head in strongly attenuated form. One way of accomplishing this is by putting multiple interfaces between different media in between the impinging wave and the filling head. Another way is by putting the battery cell in its entirety-which is a dissipative medium for the wave—between the impinging wave and the filling head. Placing the filling head on the opposite side of the battery when compared to the surface on which the wave impinges accomplishes both manners at once.

In some embodiments of the system, the system further comprises an impedance mismatching layer, wherein the impedance mismatching layer is located on an opposite side of the battery cell when compared to the transducer. More generally, since the system may comprise a waveguide which might redirect the wave impinging on the battery cell, the impedance mismatching layer is located on an opposite side of the battery cell when compared to the surface on which the wave impinges. Preferably, one side of the impedance mismatching layer is in direct physical contact with the battery cell.

In order to obtain a standing wave in the resonant cavity formed by the transducer and the battery cell, it is necessary that the wave reflects at least partially at the surface of the battery cell opposite to the surface of the cell on which the wave impinges. Since the interface between the battery and its surroundings involves a change of medium, and consequently a change of impedance, some degree of reflection will inevitably occur. However, it might be useful to maximize the reflection. The higher the reflection coefficient, the higher the standing wave ratio that can be attained and the lower the amount of energy/power that is transmitted beyond the battery cell and hence the higher the efficiency of the system. Preferably, the impedance mismatching layer is designed such that the reflection coefficient is superior to 0.9 over a significant part of the wavelength range of the transducer. More preferably, the impedance mismatching layer is designed such that the reflection coefficient is superior to 0.99 over a significant part of the wavelength range of the transducer.

In some embodiments of the system comprising a filling head and an impedance mismatching layer, the impedance mismatching layer between is positioned between the filling head and the battery cell, and one side of the impedance mismatching layer is in contact with the filling head and another side of the impedance mismatching layer is in contact with the battery cell.

Beyond increasing the energy/power efficiency of the system, an impedance mismatching layer positioned in this manner also limits the possibility of damaging the filling head. Preferably, the impedance mismatching layer is designed to minimize the power transfer to the filling head. To this end, the reflection coefficient of the impedance mismatching layer may be maximized and/or the surface area of the battery cell, covered by the impedance mismatching layer, may be maximized.

In the case of mechanical waves, such an impedance mismatching layer may for instance be realized by inserting a compressible elastic seal-such as a rubber O-ring-between the battery cell and the filling head.

In some embodiments of the system, the transducer is an acoustic transducer, and the wave is a longitudinal acoustic wave.

In some embodiments of the system wherein the transducer is an acoustic transducer, the amplitude of the wave is in the range of 1 to 100 m/s².

In some embodiments of the system wherein the transducer is an acoustic transducer, the frequency of the wave is in the range of 1 kHz to 100 MHz.

In some embodiments of the system, the transducer is an electromagnetic transducer, and the wave is a transverse electric, transverse magnetic or transverse electromagnetic wave.

According to a second aspect of the invention, a method for accelerating the infiltration of a liquid electrolyte in a battery cell is disclosed, the method comprising the steps of:

generating a wave by exciting a transducer with an excitation signal, the excitation signal having a voltage, a current and a dominant frequency, the wave having a wavelength and a direction of propagation;

positioning the transducer and the battery cell such that the battery cell sits in the direction of propagation;

positioning the transducer and the battery cell such that a distance from the transducer to a surface of the battery cell, furthest away from the transducer, is equal to or larger than one fourth of the wavelength controlling the transducer using a controller to bring the voltage and the current of the excitation signal in phase with one another.

BRIEF DESCRIPTION OF THE DRAWINGS

These and other technical features and advantages of embodiments of the present invention will now be described in more detail with reference to the accompanying figures, in which.

DETAILED DESCRIPTION

Figure 1:
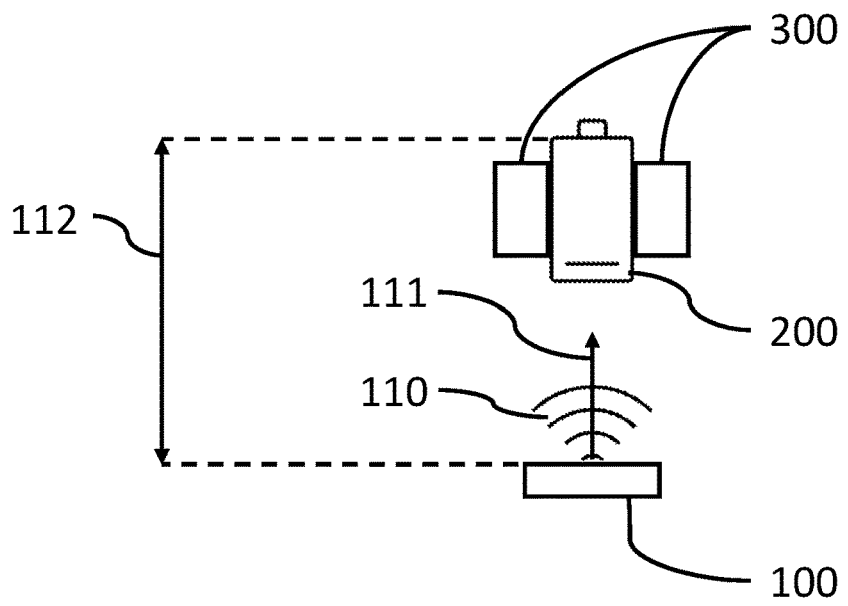
FIG. 1 schematically illustrates an embodiment of a system according to the present invention.

The present disclosure will be described in terms of specific embodiments, which are illustrative of the disclosure, and which are not to be construed as limiting. It will be appreciated that the present disclosure is not limited by what has been particularly shown and/or described and that alternatives or modified embodiments could be developed in the light of the overall teaching of this disclosure. The drawings described are only schematic and are non-limiting.

Reference throughout this description to "one embodiment" or "an embodiment" means that a particular feature, structure or characteristic described in connection with the embodiments is included in one or more embodiments of the present disclosure. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Specific features, structures or characteristics are indicated in the figures by reference numerals. In order not to overload the figures, not every feature is indicated in every figure. Conversely, in order not to overload the text, not every feature indicated in a figure is also discussed in the context of this particular figure.

Finally, the use of ordinal numbers such as "first", "second" and the like throughout this disclosure in no way implies a hierarchical relationship—not in terms of importance, position or time-between the features with which they are used, unless explicitly stated to the contrary. These ordinal numbers serve only to differentiate between different but similar features, properties, or structures.

FIG. 1 schematically illustrates an embodiment of a system according to the present invention. A transducer 100 generates a wave 110 in response to the excitation of the transducer with an excitation signal. The wave 110 has a direction of propagation 111. A means for positioning 300 keeps a battery cell 200 in place such that the cell sits in the direction of propagation and such that the distance 112 between the transducer 100 and the far end of the battery cell 200 is equal or superior to one fourth of the wavelength of the wave 110.

Figure 2A:
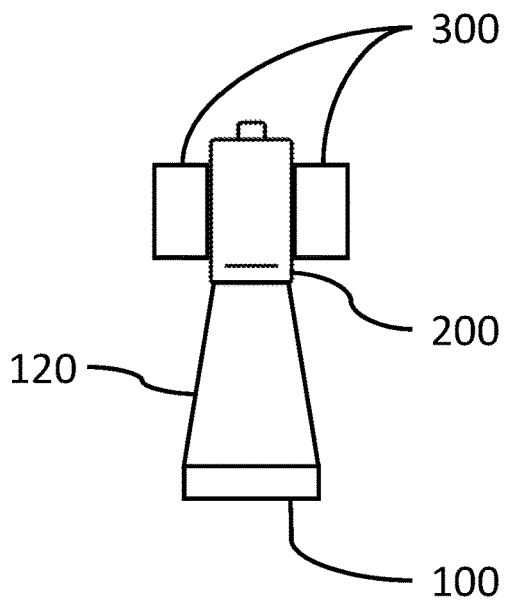
FIGS. 2a-2e schematically illustrate further embodiments of a system according to the present invention.

In the embodiment of FIG. 2a, a waveguide 120 is positioned between the transducer 100 and the near end of the battery cell 200. One end of the waveguide is in contact with the transducer whereas the other end is in contact with the near end of the battery cell. In this embodiment, the waveguide focuses the wave onto the battery cell. This has multiple advantages. First of all, both the power/energy efficiency and the total useful power of the system are increased since a larger part of the radiated power can be put to use instead of being dissipated in the surroundings. Secondly, because of decreased dissipation in the surroundings, the distance between the transducer and the battery cell can be increased.

Figure 2B:
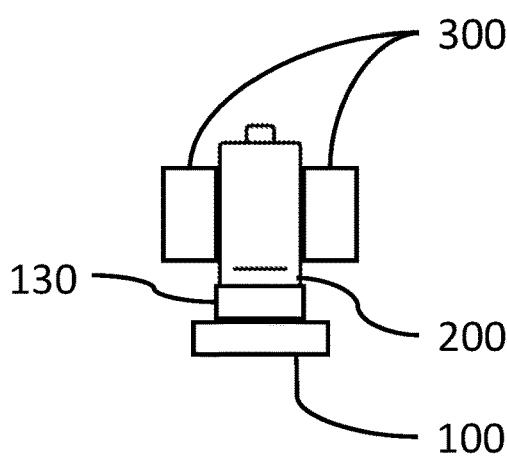

In the embodiment of FIG. 2b, an impedance matching layer 130 is positioned between the transducer 100 and the near end of the battery cell 200. One end of the impedance matching layer is in contact with the transducer whereas the other end is in contact with the near end of the battery cell. The advantages of the use of an impedance matching layer are similar to those of the use of a waveguide, albeit for different reasons. The impedance matching layer reduces the amount of wave reflection that occurs at the end of the transducer. This increases the power/energy efficiency and the total useful power of the system since a larger part of the radiated power can be transmitted to the battery cell. In addition, the chance that standing waves can form in the cavity between the transducer and the near end of the battery cell is reduced.

The impedance matching layer is preferably connected to the transducer, the waveguide, and the cell, in such a way as to optimize the power transfer efficiency. The respective materials may for example be glued together (in which case the adhesive or glue also becomes part of the matching) or mechanically anchored together (e.g., by bolting).

Depending on the chosen materials, the interface layer may be pre-stressed in order to take away any interfering free space. In a specific embodiment, the filling head presses the cell against the transducer and matching layer, ensuring good, substantially air-less contact between them. On the transducer side, pre-stress may be obtained by means of a thread connection.

Figure 2C:
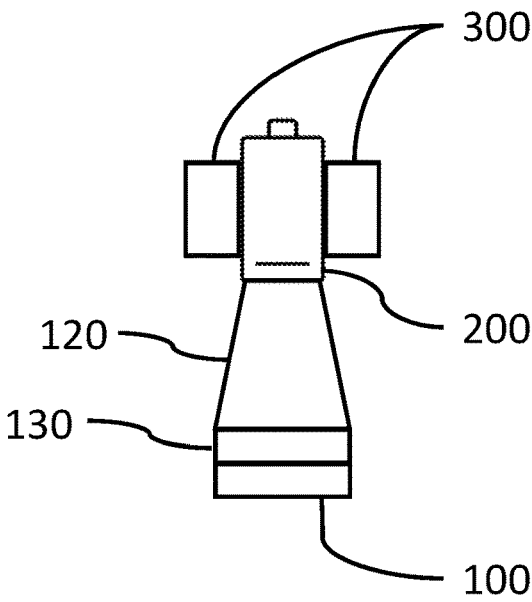

In the embodiment of FIG. 2c, both an impedance matching layer 130 and a waveguide 120 are positioned between the transducer 100 and the battery cell 200. This embodiment combines the advantages of the two embodiments mentioned hereabove. It should be noted that an impedance matching layer could also be inserted between the waveguide and the battery cell, in replacement of or in addition to the illustrated position of the impedance matching layer. In addition, it should be noted that the waveguide could be designed to take on both the role of waveguide and imped-ance matching layer, thereby negating the need for a dedi-cated impedance matching layer.

Figure 2D:
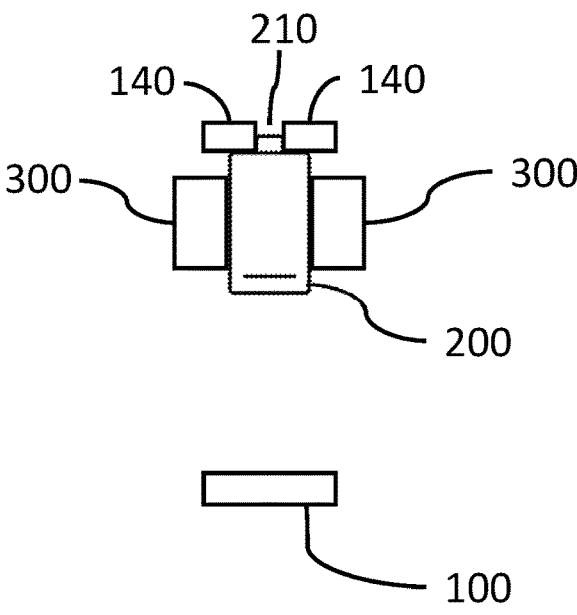

In the embodiment of FIG. 2*d*, an impedance mismatch-ing layer 140 is positioned against the far end of the battery cell. In the illustrated embodiment, the impedance mis-matching layer comprises a central opening such that the filling opening 210 of the battery cell remains accessible. Preferably, the difference between the output impedance of the battery cell and the impedance of the impedance mis-matching layer is as large as possible over the range of wavelengths that can be generated by the transducer. Such an impedance mismatch ensures that significant reflection occurs at the interface between the battery cell and the impedance mismatching layer. This has two advantages: a large amount of reflection ensures that little power is trans-mitted to the surroundings beyond the battery cell, thereby increasing the power/energy efficiency of the system and avoiding possible damage to these surroundings. In order to achieve a standing wave inside the resonant cavity defined by the transducer and the battery cell, a minimum amount of reflection at this interface is an absolute necessity. Prefer-ably, the absolute value of the reflection coefficient at the interface between the battery cell and the impedance mis-matching layer is superior to 0.9, more preferably superior to 0.99.

Figure 2E:
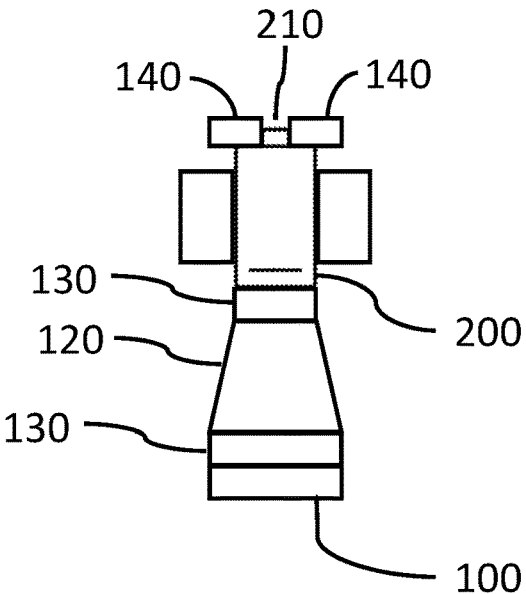

The embodiment of FIG. 2*e* features two impedance matching layers 130, a waveguide 120 and an impedance matching layer 140. This embodiment combines all of the advantages mentioned hereabove.

While the invention has been described hereinabove with reference to specific embodiments, this has been done to clarify and not to limit the invention, the scope of which is defined by the accompanying claims and their legal equiva-lents.

The invention claimed is:

1. A system for accelerating the infiltration of a liquid electrolyte in a battery cell, the system comprising:
   (a) means for positioning the battery cell;
   (b) a transducer for generating a wave in response to an excitation signal, the excitation signal having a voltage, a current and a dominant frequency, the wave having a wavelength and a direction of propagation;
   (c) a controller for controlling the transducer;
   (d) an impedance mismatching layer;
   wherein the transducer and the battery cell are positioned such that the battery cell sits in the direction of propa-gation;
   wherein the transducer and the battery cell are positioned such that a distance from the transducer to a surface of the battery cell, furthest away from the transducer, is equal to or larger than one fourth of the wavelength;
   wherein the controller is configured to bring the voltage and the current of the transducer in phase with one another, wherein the impedance mismatching layer is located on an opposite side of the battery cell when compared to the transducer.

2. The system according to claim 1, wherein the controller is configured to modify the dominant frequency of the excitation signal in order to bring the voltage and the current of the excitation signal in phase with one another.

3. The system according to claim 1, the system further comprising a waveguide positioned between the transducer and the battery cell.

4. The system according to claim 1, the system further comprising an impedance matching layer positioned between the transducer and the battery cell.

5. The system according to claim 4, wherein the imped-ance matching layer is designed to maximize a power transfer from the transducer to the battery cell.

6. The system according to claim 4, wherein the imped-ance matching layer is designed to maximize a power efficiency of the system.

7. The system according to claim 1, the system further comprising a filling head for filling the battery cell with liquid electrolyte.

8. The system according to claim 7, wherein the filling head is located on an opposite side of the battery cell when compared to the transducer.

9. The system according to claim 8, wherein the imped-ance mismatching layer is positioned between the filling head and the battery cell,
   wherein one side of the impedance mismatching layer is in contact with the filling head and an other side of the impedance mismatching layer is in contact with the battery cell.

10. The system according to claim 1, wherein the trans-ducer is an acoustic transducer, wherein the wave is a longitudinal acoustic wave.

11. The system according to claim 10, wherein an ampli-tude of the wave is in the range of 1 to 100 m/s2.

12. The system according to claim 10, wherein the fre-quency of the wave is in the range of 1 kHz to 100 MHz.

13. The system according to claim 1, wherein the trans-ducer is an electromagnetic transducer,
   wherein the wave is a transverse electric, transverse magnetic or transverse electromagnetic wave.

14. A method for accelerating the infiltration of a liquid electrolyte in a battery cell using the system according to claim 1, the method comprising the steps of:
   (a) generating a wave by exciting a transducer with an excitation signal, the excitation signal having a voltage, a current and a dominant frequency, the wave having a wavelength and a direction of propagation;
   (b) positioning the transducer and the battery cell such that the battery cell sits in the direction of propagation;
   (c) positioning the transducer and the battery cell such that a distance from the transducer to a surface of the battery cell, furthest away from the transducer, is equal to or larger than one fourth of the wavelength
   (d) controlling the transducer using a controller to bring the voltage and the current of the excitation signal in phase with one another.

\* \* \* \* \*